United States Patent
Rommelfanger et al.

(10) Patent No.: US 12,304,335 B2
(45) Date of Patent: May 20, 2025

(54) EASY-TO-CLEAN STORAGE DEVICE FOR A CHARGING CABLE OF A MOTOR VEHICLE

(71) Applicant: Dr. Ing. h.c. F. Porsche Aktiengesellschaft, Stuttgart (DE)

(72) Inventors: Scally Rommelfanger, Bad Liebenzell (DE); Tobias Bongards, Ludwigsburg (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 390 days.

(21) Appl. No.: 17/945,470

(22) Filed: Sep. 15, 2022

(65) Prior Publication Data
US 2023/0166609 A1  Jun. 1, 2023

(30) Foreign Application Priority Data
Nov. 26, 2021 (DE) ..................... 10 2021 131 053.9

(51) Int. Cl.
*B60L 53/16* (2019.01)
*B60R 7/02* (2006.01)

(52) U.S. Cl.
CPC ................ *B60L 53/16* (2019.02); *B60R 7/02* (2013.01)

(58) Field of Classification Search
CPC ... B60L 53/16; B60R 7/00; B60R 7/02; B60R 5/04
See application file for complete search history.

(56) References Cited

U.S. PATENT DOCUMENTS

| | | | | |
|---|---|---|---|---|
| 6,749,241 | B1 * | 6/2004 | Erlandsson | B60R 7/02 410/129 |
| 8,701,951 | B2 * | 4/2014 | Lucas | B60R 7/046 224/418 |
| 10,029,618 | B2 * | 7/2018 | Perez Astudillo | B60R 5/048 |
| 2017/0172270 | A1 * | 6/2017 | Runge | A45C 13/00 |
| 2020/0130587 | A1 * | 4/2020 | Cho | B60R 5/04 |

FOREIGN PATENT DOCUMENTS

DE  102020006865  12/2020

OTHER PUBLICATIONS

German Search Report dated Jun. 24, 2022.

\* cited by examiner

*Primary Examiner* — Tulsidas C Patel
*Assistant Examiner* — Carlos E Lopez-Pagan
(74) *Attorney, Agent, or Firm* — Gerald E. Hespos; Michael J Porco

(57) ABSTRACT

A storage device (20) is provided for a charging cable that can charge an electrically drivable motor vehicle. The motor vehicle has a trunk (10) with side wall (16). A recess (22) for receiving the charging cable is formed in the side wall (16) and a receiving unit (24) is fastened detachably in the recess (22). The receiving unit (24) can be moved from a closed position, in which the receiving unit (24) is received in the recess (22), to an open position, in which the receiving unit (24) is positioned at least partially out of the recess (22). A receiving opening (26) of the receiving unit (24) is covered by the side wall (16) in the closed position and is accessible for the charging cable in the open position. The separate and detachable receiving unit (24) permits simple storing of a charging cable in an easy-to-clean storage device (20).

18 Claims, 3 Drawing Sheets

EASY-TO-CLEAN STORAGE DEVICE FOR A CHARGING CABLE OF A MOTOR VEHICLE

CROSS-REFERENCE TO RELATED APPLICATION

This application claims priority on German Patent Application No 10 2021 131 053.9 filed Nov. 26, 2021, the entire disclosure of which is incorporated herein by reference

BACKGROUND

Field of the Invention

The invention relates to an easy-to-clean storage device for storing a charging cable that is provided for charging an electrically drivable motor vehicle.

Related Art

DE 10 2020 006 865 A1 discloses a motor vehicle with a receiving space for receiving a charging cable. The receiving space is formed in a side wall of a trunk and can be closed by a sliding door that can be slid in the direction of travel along the side wall.

U.S. Pat. No. 8,701,951 discloses a carrying bag that can receive a charging cable and that is insertable in a recess of a front door of a motor vehicle.

There is a constant need to simply store and carry along a charging cable of a motor vehicle in an easy-to-clean storage device.

The object of the invention is to enable a charging cable to be stored simply in an easy-to-clean storage device in a motor vehicle.

SUMMARY

A storage device in accordance with the invention is described below, and aspects of the invention can be used individually or in combination. If one feature is shown in combination with another feature, this is only for the purpose of simplifying the presentation of the invention and is not intended to mean that this feature cannot also be a development of the invention without the other feature.

One embodiment relates to a storage device for storing a charging cable provided for charging an electrically drivable motor vehicle. The motor vehicle has a trunk with a side wall, and a recess is formed in the side wall. A receiving unit for receiving the charging cable is fastened detachably in the recess. The receiving unit can be moved from a closed position, in which the receiving unit is received in the recess, to an open position, in which the receiving unit is positioned at least partially out of the recess. A receiving opening of the receiving unit is covered by the side wall in the closed position and is accessible for the charging cable in the open position.

The charging cable for charging the electrically drivable motor vehicle may be soiled on its outside by environmental factors, in particular rain, dust and the like. The charging cable is to be stored in a rear and/or front trunk to ensure that vehicle occupants are not to be soiled by the charging cable. However, the charging cable also could soil objects stored in the trunk. Thus, the charging cable can be stored in the receiving unit separately from the objects stored in the trunk. Accordingly, the charging cable cannot unintentionally contact and soil objects stored in the trunk. For this purpose, the charging cable can be inserted from above via the open receiving opening and into the receiving unit. The receiving unit is moved out of the recess of the side wall in the open position. Thus, the charging cable can be stored in the receiving unit at a sufficient distance from the side wall so that the charging cable cannot contact the surface of the side wall facing an interior of the trunk. With this configuration, the charging cable cannot soil the side wall or a textile lining of the side wall. The receiving unit can be moved to the closed position after the charging cable is stored in the receiving unit. In the closed position, the receiving opening of the receiving unit is covered by the material of the side wall that delimits the recess. The charging cable is thereby essentially inaccessible in the volume of the recess and also cannot cause any soiling via the receiving opening. In the closed position, the possibly soiled charging cable may be enclosed within the receiving unit received in the receiving opening and a cover wall of the recess of the side wall covers the receiving opening of the receiving unit via an air gap.

The charging cable that is in the receiving unit may be in direct contact with an inside of the receiving unit and may soil the receiving unit. The receiving unit therefore is formed separately from the recess formed by the side wall and is detachably connected to the side wall. The receiving unit can be fastened detachably to the side wall at least at one point via fastening technology provided within the recess. For example, the fastening technology may be formed by a hook-and-loop connection, a clip connection or a hook/eye connection. This allows the receiving unit soiled by the charging cable to be detached from the side wall while the charging cable is being used for electrically charging the motor vehicle. The receiving unit detached from the recess of the side wall is easily accessible at all surfaces and hence can be cleaned easily and quickly. Thus, this embodiment provides a separate and detachable receiving unit that can be moved out of the recess, that provides simple storage of a charging cable and that is easy-to-clean.

The charging cable may comprise an output plug for plugging into a charging socket of the motor vehicle and an input plug for plugging into a power source, for example a household socket or a charging station. The charging cable may comprise a control box, in particular an essentially quadrangular control box, between the input plug and the output plug. The charging cable also may have a cooling device for removing heat arising during charging. The cooling device of some embodiments is operated with air and/or water as a cooling medium.

The side wall can be an interior component that can be adjacent to other interior components and/or connected to a supporting structure. The side wall of some embodiments is made of plastic and can be part of a tray for delimiting the trunk volume. The tray can be a single piece or multiple parts. For example, the side wall can run in the direction of travel, in particular in the X-direction, so that the recess can be transverse to the direction of travel, in particular in the Y-direction. It is also possible for the side wall to be transverse to the direction of travel, in particular in the Y-direction, so that the recess can be formed in or opposite to the direction of travel, in particular in the X-direction. The side wall can be connected to a supporting structure of the motor vehicle and/or body elements of the motor vehicle. The recess can be a depression opened toward the trunk volume in the Y-direction or in the X-direction. The recess in the side wall may be provided in the Z-direction in a height region above a floor panel of the trunk provided for storing objects in the trunk. In particular, the recess is provided above a volume for a spare wheel and can be covered by the floor panel. The receiving unit received in the recess is thus easily accessible for removing and/or storing the charging cable. In particular, the receiving unit can be locked in the closed position and/or in the open position, preferably to the side wall.

An X-direction is understood to mean a coordinate direction along a longitudinal axis of a motor vehicle when the storage device is installed in the motor vehicle. When the motor vehicle travels straight ahead, the X-direction is oriented in the direction of travel of the motor vehicle. The X-direction is essentially horizontal when the motor vehicle is parked on level horizontal ground. A Y-direction is understood to mean a coordinate direction along a transverse axis of a motor vehicle when the storage device is installed in the motor vehicle. The Y-direction is essentially horizontal when the motor vehicle is parked on level horizontal ground. A Z-direction means a coordinate direction along a vertical axis of a motor vehicle when the storage device is installed in the motor vehicle. The Z-direction is essentially vertical when the motor vehicle is parked on level horizontal ground. The X-direction, the Y-direction, and the Z-direction are oriented orthogonally to one another.

The receiving unit can be moved at least proportionately by a translational movement between the closed position and the open position. Thus, the receiving unit can be pulled out of the recess of the side wall and pushed into the recess of the side wall in the Y-direction in a manner comparable to a drawer. The receiving opening of the receiving unit can be essentially rectangular when viewed in the Z-direction. In particular, the receiving unit is essentially quadrangular with essentially rectangular walls.

The receiving unit can be moved at least proportionately by a pivoting movement about a pivot axis between the closed position and the open position. The pivot axis may be oriented in the X-direction or in the Z-direction. In particular, the receiving unit can be positioned between the closed position and the open position in an intermediate position, in a continuously reachable intermediate position. As a result, the receiving unit can be pivoted easily into the recess of the side wall and pivoted out of the recess. The receiving unit can be wedge-shaped. When the pivot axis is oriented in the X-direction, the receiving opening can be essentially rectangular, and the receiving unit can taper down from the receiving opening in a funnel-like manner. When the pivot axis is oriented in the Z-direction, the receiving opening may be essentially triangular.

In some embodiments, the receiving unit is fastened to the side wall via a guide device in the closed position and in the open position. For example, the guide device may comprise extending elements and/or unfolding elements. The guide device may comprise guide rails, in particular telescopic guide rails, and/or tilting and/or folding kinematics. For example, the receiving unit may comprise guide rollers that are guided in a telescoping guide rail connected to the side wall within the receiving opening. Thus, the guide rollers can be guided out of the guide rail via an upper recess in the guide rail and re-mounted after cleaning the receiving unit.

The receiving unit of some embodiments has a bag made of a flexible, in particular elastic, material. The bag may be connected detachably to the guide device. The textile material of the bag allows the charging cable to be put into the interior of the bag and thus into the interior of the receiving unit in essentially any manner and to be stored in the recess of the side wall. Depending on how the charging cable is rolled up, the bag can adapt within certain limits to the volume occupied by the charging cable.

The bag may be made of a machine-washable material. As a result, the bag of the receiving unit easily can be cleaned in a washing machine in a normal wash cycle, in particular within a short wash cycle. Wiping the receiving unit by hand to remove soiling caused by the charging cable thus is not necessary. Instead, the bag of the receiving unit can generally be washed together with other laundry accumulating in a private household.

The charging cable can be clamped and/or fixed between the side wall and the receiving unit in the closed position. The charging cable thus can be retained within the receiving unit with contact pressure so that rattling of the charging cable in the closed position of the receiving unit can be avoided. In particular, if the receiving unit has a bag made of an elastic material, the bag can be elastically widened in the open position and can elastically contract in the closed position to such an extent that the charging cable is fixed almost immovably within the bag.

A drive motor for moving the receiving unit between the closed position and the open position may be provided. The drive motor can be actuated via a manually operable switch and/or a proximity sensor and/or a trunk opening sensor. As a result, the charging cable can be stored and removed more comfortably. For example, the trunk opening sensor may detect a manual and/or radio-triggered opening of a trunk lid and may automatically move the receiving unit to the open position so that the charging cable can be removed and/or stored.

The receiving unit of some embodiments has a receiving contour for holding a charging plug of the charging cable. The at least one charging plug of the charging cable easily can be held within the receiving unit in a position in which the charging plug can be positioned far enough away from dirt that may accumulate at the bottom of the receiving unit. Impairment of the charging process due to soiled charging contacts can thereby be avoided.

Another embodiment relates to a motor vehicle with a rear and/or front trunk. At least one side of the trunk is formed by a storage device that may be formed and developed as described above. By means of the separate and detachable storage-device receiving unit that can be moved out of the recess, simply storing a charging cable of a motor vehicle in an easy-to-clean storage device is enabled.

The invention is explained by way of example below with reference to the accompanying drawings on the basis of preferred exemplary embodiments. The features presented below may represent an aspect of the invention both individually and in combination.

DETAILED DESCRIPTION

Figure 1:
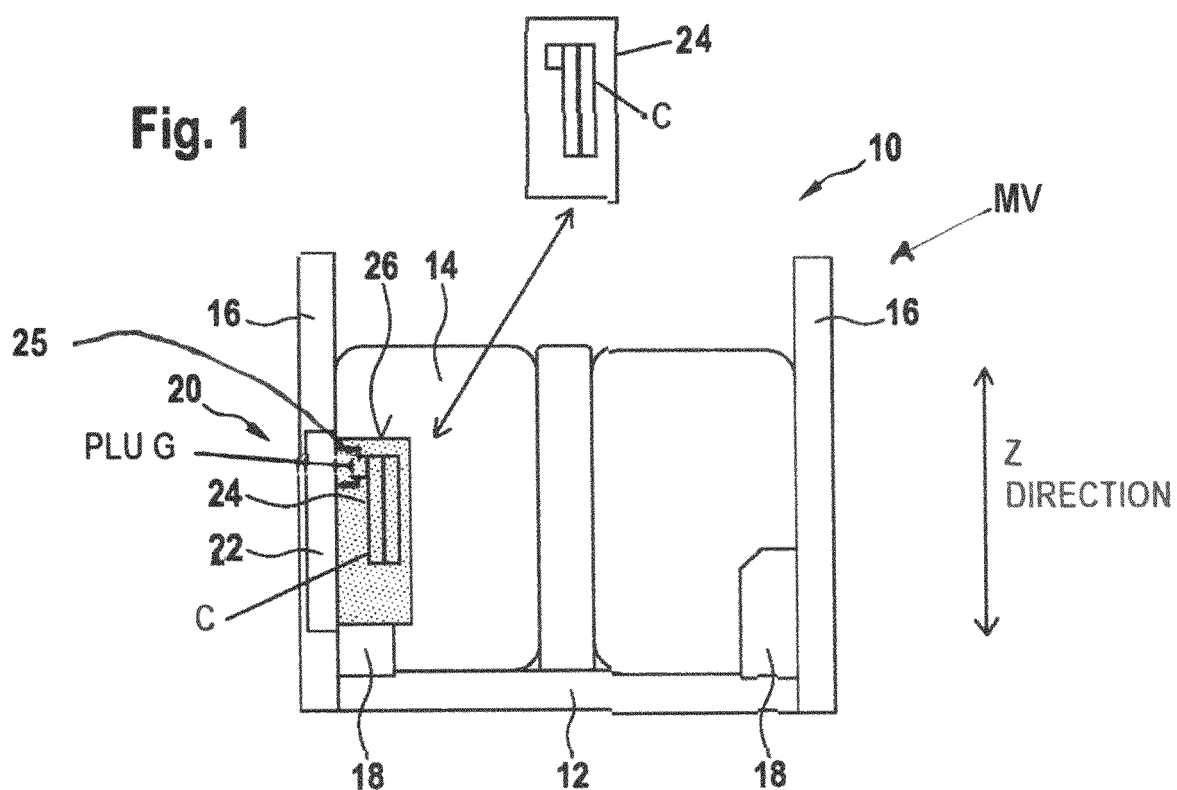
FIG. 1 is a schematic front view of a first embodiment of a trunk of a motor vehicle with a receiving unit in the open position.

The trunk 10 shown in FIG. 1 may be part of an electrically drivable motor vehicle MV and can be provided at the rear and/or at the front. The trunk 10 has a floor panel 12 on which objects can be placed and transported in the trunk 10. A hollow space for receiving a spare wheel or the like may be provided below the floor panel 12. In the illustrated embodiment, the trunk 10 is provided at the rear of the motor vehicle MV and is delimited in the direction of travel by a rear bench seat 14. In the transverse direction, the trunk 10 may be delimited by side walls 16, each of which extends along a wheel case 18. One of the side walls 16 is part of a storage device 20 and has a recess 22 formed in the side wall 16. A receiving unit 24 can project from the side wall 16 and in the open position shown in FIG. 1 the receiving unit 24 forms an upper receiving opening 26 that is freely accessible. A possibly soiled charging cable C can be stored in the receiving unit 24 via the receiving opening 26. The receiving unit 24 of some embodiments has a receiving contour 25 for holding the charging plug of the charging cable C at a position spaced above a bottom of the receiving unit 24 and hence above a position in the receiving unit 24 where dirt may accumulate.

Figure 2:
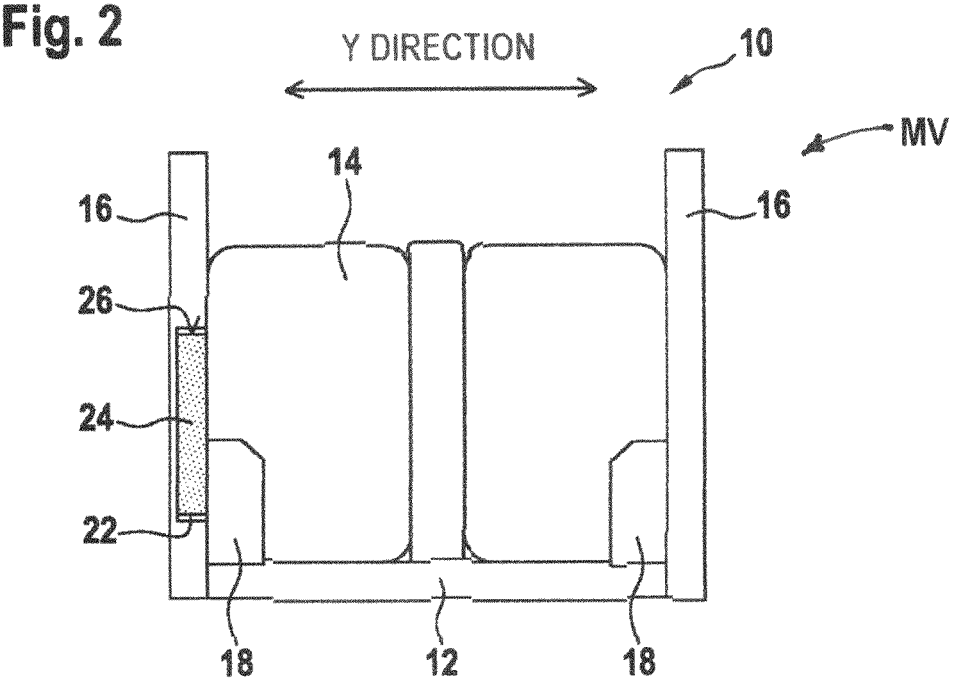
FIG. 2 is a schematic front view of the trunk of FIG. 1 with the receiving unit in the closed position.

As shown in FIG. 2, the receiving unit 24 can thereafter be pushed into the recess 22 via a translational movement in a manner comparable to a drawer. In the closed position, the receiving opening 26 is covered by the material of the side wall 16 delimiting the recess 22, such that soiling by the charging cable C can be avoided. The receiving unit 24 is detachably fastened to the side wall 16 so that the receiving unit 24 can be cleaned easily when in the separated state.

Figure 3:
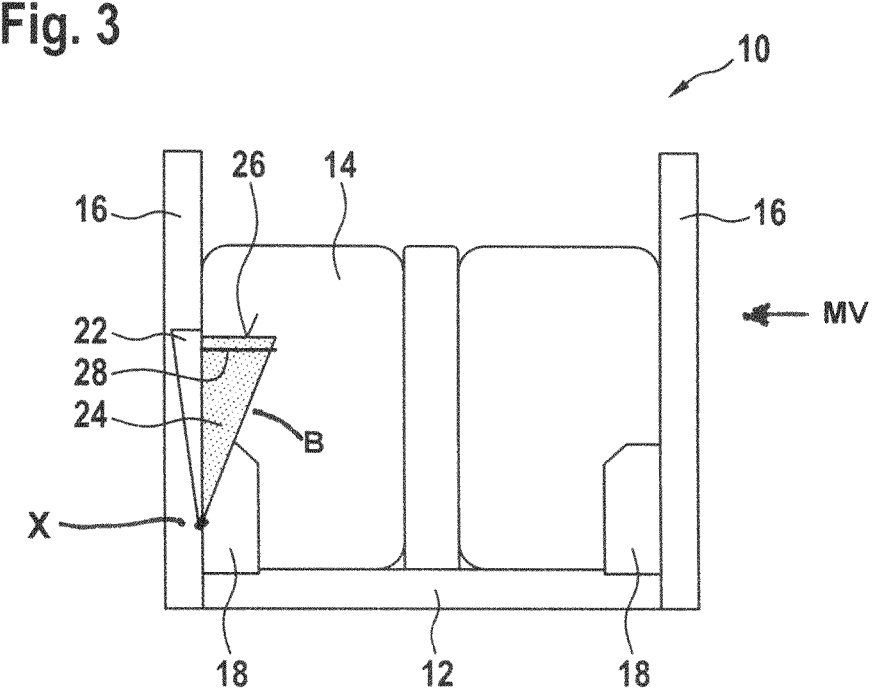
FIG. 3 is a schematic front view of a second embodiment of a trunk with a receiving unit in the open position.
Figure 5:
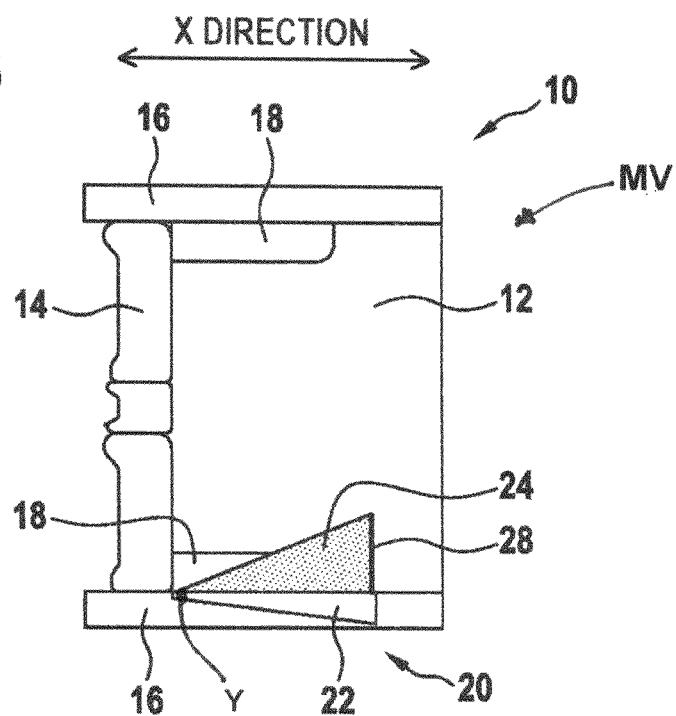
FIG. 5 is a schematic top view of a third embodiment of a trunk of a motor vehicle with a receiving unit in the open position.

As shown in FIG. 3, the receiving unit 24 also can be moved relative to the side wall 16 by a pivoting movement about a pivot axis X. In the illustrated embodiment of FIG. 3, the pivot axis X is at the lower edge of the receiving unit 24 and extends in the X direction of travel, which is illustrated in FIG. 5 and is normal to the plane of FIG. 3. The receiving unit 24 may have a triangular cross-section with a rectangular receiving opening 26. In addition, in the illustrated embodiment, the receiving unit 24 is produced from an elastic textile, in particular a machine-washable material, to form a bag B that is guided, for example, via guide rollers, in a guide device 28 designed as a guide rail that extends in the Y direction.

Figure 4:
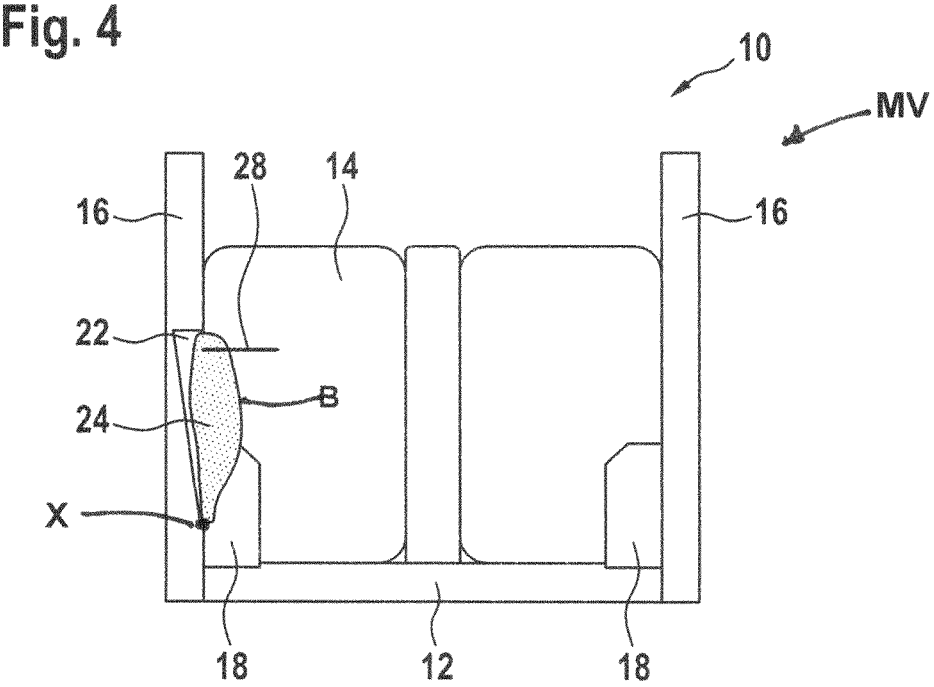
FIG. 4 is a schematic front view of the trunk of FIG. 3 with the receiving unit in the closed position.

As shown in FIG. 4, in the closed position, the textile material of the receiving unit 24 may essentially immovably fix and/or clamp the charging cable received in the receiving unit 24. In particular, in the closed position, the receiving unit is locked to the side wall 16 so that sufficient contact pressure can be applied by the receiving unit 24 to the charging cable in order to clamp and retain the charging cable between the side of the receiving unit 24 facing the volume of the trunk 10 and the side wall 16.

As shown in FIG. 5, the receiving unit 24 can also be moved about a pivot axis running vertically. In this case, the receiving opening 26 may be triangular.

Figure 6:
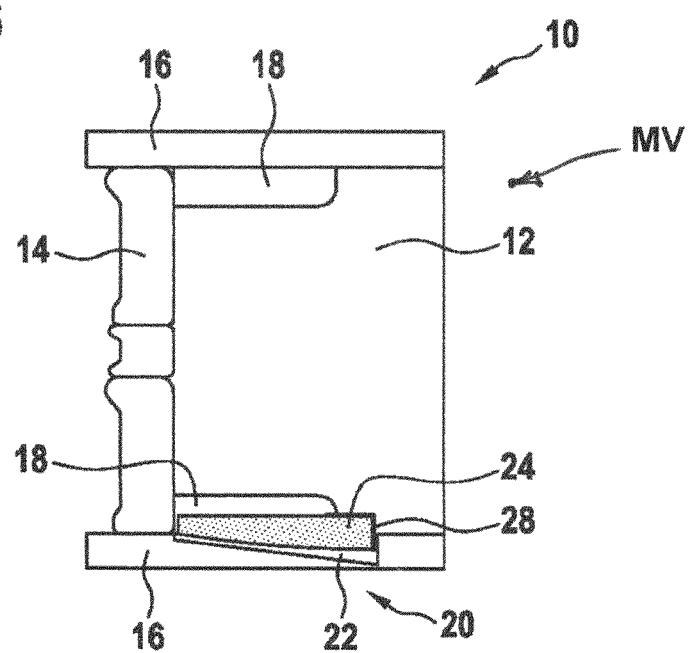
FIG. 6 is a schematic top view of the trunk of FIG. 5 with the receiving unit in the closed position.

As shown in FIG. 6, in the closed position, the receiving unit 24 can be to a large extent submerged in the recess 22 of the side wall 16. However, it is also possible for a portion of the receiving unit 24 to project somewhat from the recess 22 so that manually moving the receiving unit 24 from the closed position to the open position by a translational movement and/or a pivoting movement is simplified.

The invention claimed is:

1. A storage device (20) for storing a charging cable for charging an electrically drivable motor vehicle that has a trunk (10), a side wall (16) forming part of the trunk (10) of the motor vehicle, a recess (22) formed in the side wall (16), the storage device comprising:

a receiving unit (24) detachably fastened in the recess (22) for receiving the charging cable, the receiving unit (24) being moveable between a closed position, in which the receiving unit (24) is received in the recess (22) and an open position in which the receiving unit (24) is positioned at least partially out of the recess (22), the receiving unit (24) having a closed bottom and a top opposite the closed bottom, the top forming a receiving opening (26) that is covered by the side wall (16) in the closed position and accessible for the charging cable in the open position, an interior of the receiving unit (24) having a receiving contour spaced from the closed bottom of the receiving unit (34), the receiving contour being configured for holding a charging plug of the charging cable at a position spaced from dirt that may accumulate at the closed bottom of the receiving unit (24).

2. The storage device (20) of claim 1, wherein the receiving unit (24) can be moved by a translational movement between the closed position and the open position.

3. The storage device (20) of claim 1, wherein the receiving unit (24) can be moved by a pivoting movement about a pivot axis between the closed position and the open position, wherein the pivot axis is oriented in an X-direction or in a Z-direction of the vehicle and is at a position adjacent to the side wall (16).

4. The storage device (20) of claim 1 wherein the charging cable can be clamped and/or fixed between the side wall (16) and the receiving unit in the closed position.

5. The storage device of claim 1, further comprising a drive motor for moving the receiving unit (24) between the closed position and the open position, the drive motor can be actuated via a manually operable switch and/or a proximity sensor and/or a trunk opening sensor.

6. A motor vehicle with a rear and/or front trunk (10), wherein at least one side of the trunk (10) is formed by the storage device (20) of claim 1.

7. The storage device (20) of claim 3, wherein the receiving unit (24) is fastened to the side wall (16) via a guide device (28) in the closed position and in the open position.

8. The storage device (20) of claim 7, wherein the receiving unit (24) has a bag made of a flexible material, and the bag is connected detachably to the guide device (28).

9. The storage device (20) of claim 5, wherein the bag is made of a machine-washable material.

10. An electrically drivable motor vehicle having opposite front and rear ends, the electrically drivable motor vehicle comprising:

a trunk (10) at one of the front and rear ends of the motor vehicle, the trunk having a floor panel (12) and side walls (16) extending up from the floor panel (12), a recess (22) formed in one of the side walls (16);

a receiving unit (24) detachably fastened in the recess (22), the receiving unit (24) being moveable between a closed position, in which the receiving unit (24) is received in the recess (22) and an open position in which the receiving unit (24) is positioned at least partially out of the recess (22), the receiving unit (24) having a receiving opening (26) covered by the side wall (16) when the receiving unit (24) is in the closed position, and the receiving opening (26) being accessible at the trunk (10) when the receiving unit (24) is in the open position, the receiving unit (24) being pivotable about a pivot axis between the closed position and the open position, the pivot axis being oriented in a front-rear direction of the electrically drivable motor vehicle; and a charging cable positioned in the receiving unit (24) and being selectively removable from the receiving unit (24) for charging the electrically drivable motor vehicle.

11. The electrically drivable motor vehicle of claim 10, wherein an interior of the receiving unit (24) has a closed bottom and a receiving contour spaced from the closed bottom of the receiving unit (34), the receiving contour being configured and disposed for holding a charging plug of the charging cable at a position spaced from dirt that may accumulate at the closed bottom of the receiving unit (24).

12. The electrically drivable motor vehicle of claim 10, wherein the receiving unit (24) is fastened to the side wall (16) via a guide device (28) in the closed position and in the open position.

13. The electrically drivable motor vehicle of claim 10, wherein the receiving unit (24) comprises a selectively removable bag made of a flexible material and configured for enclosing the charging cable.

14. The electrically drivable motor vehicle of claim 10, wherein the side wall (16) and the receiving unit (24) are configured to clamp and/or fix the charging cable between the side wall (16) and the receiving unit (24) in the closed position.

15. An electrically drivable motor vehicle having opposite front and rear ends, the electrically drivable motor vehicle comprising:

a trunk (10) at one of the front and rear ends of the motor vehicle, the trunk having a floor panel (12) and side walls (16) extending up from the floor panel (12), a recess (22) formed in one of the side walls (16);

a receiving unit (24) detachably fastened in the recess (22), the receiving unit (24) being moveable between a closed position, in which the receiving unit (24) is received in the recess (22) and an open position in which the receiving unit (24) is positioned at least partially out of the recess (22), the receiving unit (24) having a receiving opening (26) covered by the side wall (16) when the receiving unit (24) is in the closed position, and the receiving opening (26) being accessible at the trunk (10) when receiving unit (24) is in the open position;

a charging cable positioned in the receiving unit (24) and being selectively removable from the receiving unit for charging the electrically drivable motor vehicle, 122; and a drive motor for moving the receiving unit (24) between the closed position and the open position, the drive motor can be actuated via a manually operable switch and/or a proximity sensor and/or a trunk opening sensor.

16. The electrically drivable motor vehicle of claim 15, wherein the recess (22) and the receiving unit (24) are configured to permit a translational movement of the receiving unit (24) transverse to a front-rear direction of the electrically drivable motor vehicle and between the closed position and the open position.

17. The electrically drivable motor vehicle of claim 15, wherein the receiving unit (24) is pivotable about a pivot axis between the closed position and the open position, the pivot axis being oriented in a front-rear direction of the electrically drivable motor vehicle.

18. The electrically drivable motor vehicle of claim 15, wherein the receiving unit (24) has a receiving contour for holding a charging plug of the charging cable.

* * * * *